9660X
D. Wilkinson.
Canal Lock Gate.
NO PRINTED SPECIFICATION AVAILABLE
Patented May 14, 1836.
Perspective view shewing the Valve open.
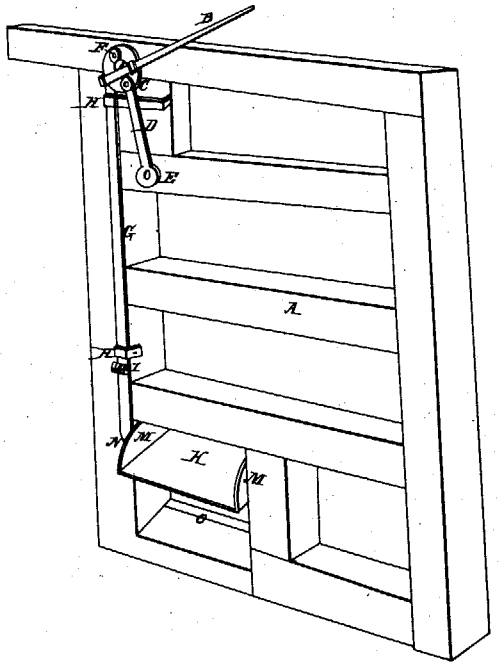
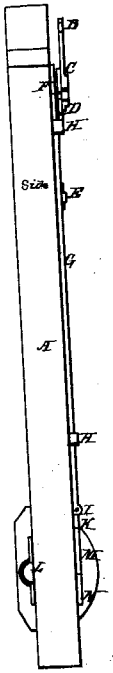
Geometrical view shewing the Valve shut.
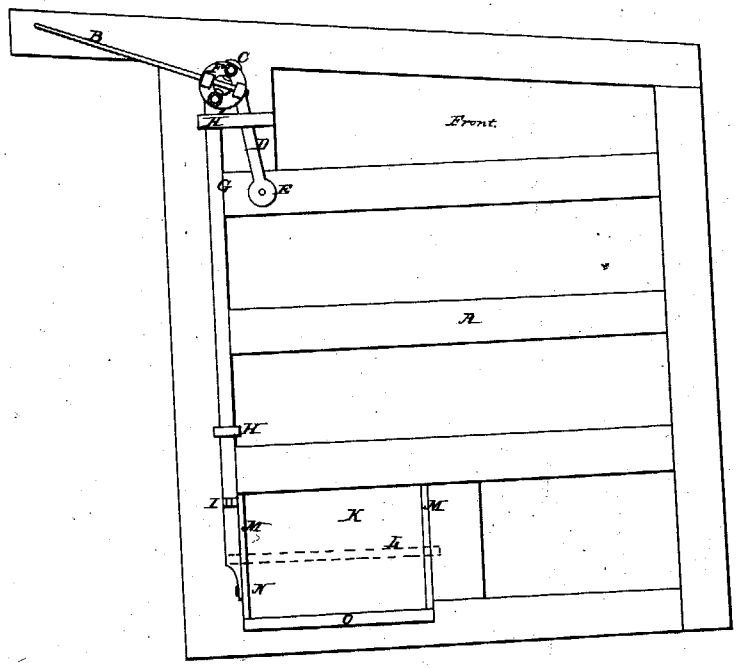

9660X

May 14. 1836

David Wilkinson of Cohoes New York
Letters Patent

The Schedule referred to in these Letters Patent and making part of the same containing a description in the words of the said David Wilkinson himself of his Improvement in the Canal Lock Gate.

Be it known that I David Wilkinson of the Town of Cohoes in the County of Albany and State of New York have made a new and useful improvement in Canal Lock Gates called "Wilkinson's improved Lock Gate", which is described as follows, reference being had to the annexed drawings of the same making part of this Specification.

A represents the frame of the Gate constructed in the usual manner. B. an eccentric lever. C moveable eccentric fulcrum. D. arm or support of the moveable eccentric fulcrum, turning on a fixed point E. F. a circular plate at the end of the eccentric lever to which the arm D. and connecting rod G. are attached and which turn on pins inserted in the rim of the circular plate, the pin C being the moveable eccentric fulcrum before mentioned. H. Staples to keep the connecting rod and arm in their proper positions. I. hinge or joint in the connecting Rod. K the valve. L the axis on which the valve turns. M. semicircular ends or flanges of the valve. N. pin by which the connecting Rod is attached to the rim of one of the semicircular ends of the valve. It being much better to make the attachment at the end instead of the centre of the valve on account of the liability by the latter mode of arresting the passage thro' the valve opening of Hay Straw Sticks &c; which may fall into the canal. O. bevelled or chamfered bottom of the valve opening against which the valve shuts tight. Operation. The axis of the valve being placed below the centre makes the area of the upper part greater than that of the lower of course the pressure of the water will be greater upon the upper than upon the lower part and will therefore keep the valve tight against the bevelled edge of the bottom. When it is required to open the valve, the power is applied to the end of the eccentric § Additional improvement added 28th April 1838 §

5/14/1836 9660 X lever and raised and made to perform a segment of a curve or epicycloid
which opens the valve by means of the connecting Rod attached to a pin
in the perimeter of the semicircle of the valve and to a pin in the
perimeter of the circular plate of the lever. The power at the commen-
ment is greatest: or a maximum, the fulcrum being then the
shortest; and when the lever is at an angle of 90° with the hori
zon or parallel with the connecting rod the power is least or a mi
nimum, but at the same time it is a maximum on the semicircle
of the gate, the lever being then the longest. This combination of
the lever for opening and shutting the valve of a canal lock Gate is
very simple, strong and easily managed by any person of the [illegible]
capacity as may be seen by examining the annexed drawings.
In a slide valve it will be necessary to move the lever half a
circle to prevent the valve falling back when the valve is down and
the pressure off. What I claim as my invention and never
before known is the application of the before described excentric lever
with the moveable connections to gain power and lose velocity, or lose
velocity and gain power: as may be required for opening and shutting
the valves of canal lock gates in the manner herein before described.
The dimensions and materials have not been mentioned as these and
the arrangement of the parts may be varied in any manner to suit the
views of the constructor; adhering however to the principle of the inven-
tion as before laid down Exd. Witnesses
W.G. Wm P. Elliot
Saml Sevill David Wilkinso (729 words)

(Granted May 14. 1836)

(See Additional Letters Patent No. 7. Recorded in Vol. No. 1. page 14
of Additional Improvements. Granted April 24. 1838)

Drawing